United States Patent
Nagasawa

(10) Patent No.: US 12,459,227 B2
(45) Date of Patent: Nov. 4, 2025

(54) SUBSTRATE

(71) Applicant: SHINKO ELECTRIC INDUSTRIES CO., LTD., Nagano (JP)

(72) Inventor: Takamasa Nagasawa, Nagano (JP)

(73) Assignee: SHINKO ELECTRIC INDUSTRIES CO., LTD., Nagano (JP)

( * ) Notice: Subject to any disclaimer, the term of this patent is extended or adjusted under 35 U.S.C. 154(b) by 313 days.

(21) Appl. No.: 18/319,657

(22) Filed: May 18, 2023

(65) Prior Publication Data

US 2023/0382076 A1   Nov. 30, 2023

(30) Foreign Application Priority Data

May 27, 2022 (JP) .................................. 2022-086984

(51) Int. Cl.
*B32B 3/20* (2006.01)
*B32B 15/08* (2006.01)
*B32B 18/00* (2006.01)
*B82Y 30/00* (2011.01)

(52) U.S. Cl.
CPC ................ *B32B 3/20* (2013.01); *B32B 15/08* (2013.01); *B32B 18/00* (2013.01); *B32B 2250/40* (2013.01); *B32B 2307/202* (2013.01); *B32B 2307/302* (2013.01); *B82Y 30/00* (2013.01)

(58) Field of Classification Search
None
See application file for complete search history.

(56) References Cited

U.S. PATENT DOCUMENTS

| | | | |
|---|---|---|---|
| 2010/0172101 A1* | 7/2010 | Yao | H01L 23/4275 428/323 |
| 2011/0090650 A1* | 4/2011 | Oda | H01L 23/373 361/717 |
| 2014/0227477 A1* | 8/2014 | Cola | C25D 7/006 427/372.2 |
| 2018/0061736 A1* | 3/2018 | Hirose | H01L 23/373 |
| 2018/0254236 A1* | 9/2018 | Cola | B82Y 30/00 |
| 2021/0172690 A1* | 6/2021 | Hirose | B32B 7/06 |

FOREIGN PATENT DOCUMENTS

| | | | | |
|---|---|---|---|---|
| JP | 2007-258416 | 10/2007 | | |
| JP | WO 2014/069153 A | * 9/2016 | ............ | B82Y 40/00 |

OTHER PUBLICATIONS

Inoue—JPWO 2014-069153 A1—MT—nanotubes w-filled polymer—2014 (Year: 2014).*

* cited by examiner

*Primary Examiner* — John Vincent Lawler
(74) *Attorney, Agent, or Firm* — IPUSA, PLLC

(57) ABSTRACT

A substrate includes a heat conduction member including a plurality of carbon nanotubes, a first resin layer provided on first ends of the plurality of carbon nanotubes, and a second resin layer provided on second ends of the plurality of carbon nanotubes, the second ends being opposite the first ends, a first metal layer laminated on the first resin layer, and a second metal layer laminated on the second resin layer, wherein neither the first resin layer nor the second resin layer contains a filler, and wherein spaces between the first ends of the plurality of carbon nanotubes are filled with a resin constituting the first resin layer, and spaces between the second ends of the plurality of carbon nanotubes are filled with a resin constituting the second resin layer.

11 Claims, 10 Drawing Sheets

SUBSTRATE

CROSS-REFERENCE TO RELATED APPLICATIONS

The present application is based on and claims priority to Japanese Patent Application No. 2022-086984 filed on May 27, 2022, with the Japanese Patent Office, the entire contents of which are incorporated herein by reference.

FIELD

The disclosures herein relate to substrates.

BACKGROUND

There is a type of substrate known in the art that includes an insulating substrate such as a ceramic substrate, a metal layer having a circuit pattern formed on one side of the insulating substrate, and a metal layer for heat dissipation formed on the other side of the insulating substrate. A device that generates heat when operating, such as a semiconductor chip for power control, is mounted on the metal layer having a circuit pattern (see Patent Document 1, for example).

The insulating substrate such as a ceramic substrate is hard with low flexibility, and has a thermal expansion coefficient different from those of the metal layers disposed on the upper and lower sides thereof. Stress is thus generated at the time of thermal load, and breaking-off may occur between the insulating substrate and the metal layers. In recent years, insulating resin layers have been widely used as substitutes for ceramic substrates and the like, and their thermal conductivity is about 10 W/m·K.

In consideration of the above-described points, there may be a need for a substrate made of a heat conduction member capable of relieving stress at the time of thermal load and having high thermal conductivity.

[Patent Document 1] Japanese Laid-Open Patent Publication No. 2007-258416

SUMMARY

According to an aspect of the embodiment, a substrate includes a heat conduction member including a plurality of carbon nanotubes, a first resin layer provided on first ends of the plurality of carbon nanotubes, and a second resin layer provided on second ends of the plurality of carbon nanotubes, the second ends being opposite the first ends, a first metal layer laminated on the first resin layer, and a second metal layer laminated on the second resin layer, wherein neither the first resin layer nor the second resin layer contains a filler, and wherein spaces between the first ends of the plurality of carbon nanotubes are filled with a resin constituting the first resin layer, and spaces between the second ends of the plurality of carbon nanotubes are filled with a resin constituting the second resin layer.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1A:
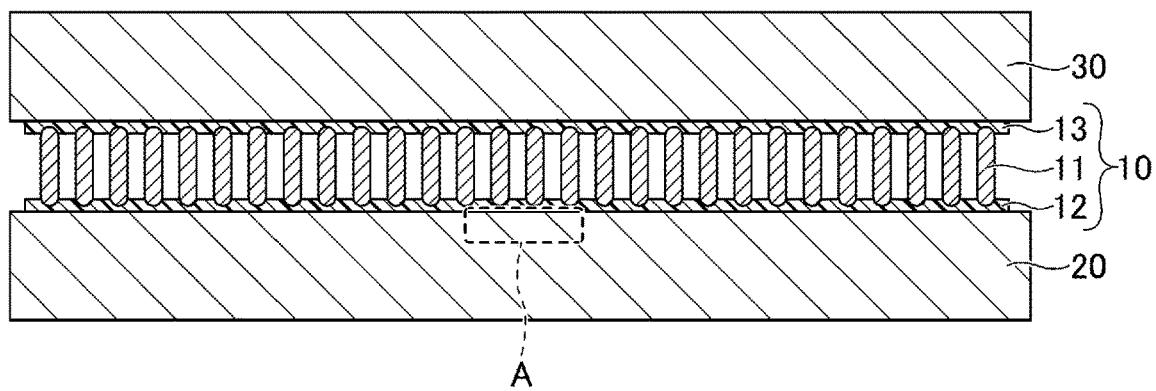
FIGS. 1A through 1C are cross-sectional views illustrating a substrate according to a first embodiment.

In the following, embodiments of the present invention will be described with reference to the accompanying drawings.

In the following, embodiments for carrying out the invention will be described with reference to the accompanying drawings. In the drawings, the same components are referred to by the same reference numerals, and a duplicate description thereof may be omitted.

First Embodiment

[Structure of Substrate]

Figure 1B:
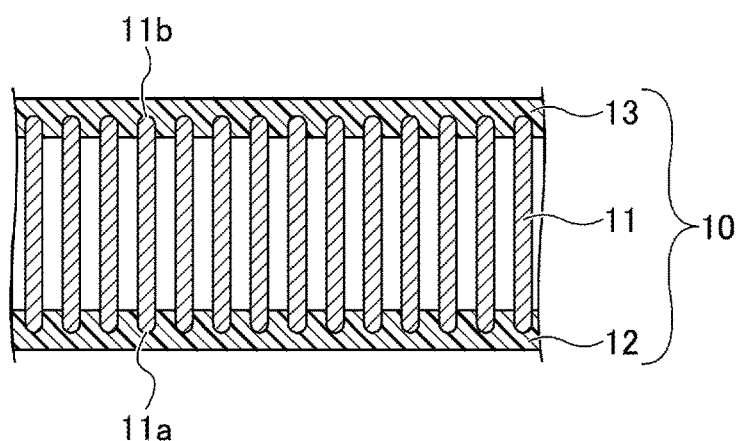
Figure 1C:
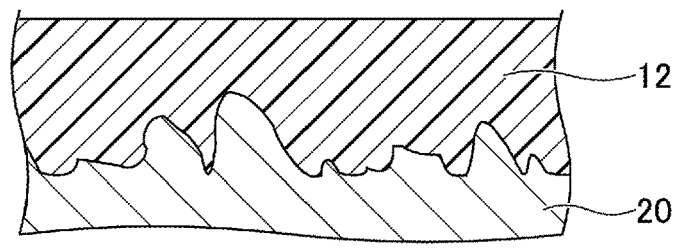

FIGS. 1A through 1C are cross-sectional views illustrating a substrate according to a first embodiment. FIG. 1A is an overall view. FIG. 1B is an enlarged partial view of a heat conduction member 10 in FIG. 1A. FIG. 1C is an enlarged view of a portion A in FIG. 1A.

Referring to FIG. 1A, a substrate 1 according to the first embodiment includes a heat conduction member 10, a first metal layer 20, and a second metal layer 30. Referring to FIG. 1B, the heat conduction member 10 includes a plurality of carbon nanotubes 11, a first resin layer 12, and a second resin layer 13.

The first metal layer 20 and the second metal layer 30 are disposed one above the other with the heat conduction member 10 interposed therebetween. The heat conduction member 10 is a thermal interface material (TIM), and conducts heat between the first metal layer 20 and the second metal layer 30. The first metal layer 20 is laminated on the first resin layer 12 of the heat conduction member 10. The upper surface of the first metal layer 20 is in contact with the lower surface of the first resin layer 12 of the heat conduction member 10. As illustrated in FIG. 1C, although the upper surface of the first metal layer 20 has surface irregularities, the resin constituting the first resin layer 12 penetrates (i.e., enters) the recesses of the upper irregular surface of the first metal layer 20. That is, the resin constituting the first resin layer 12 has a surface shape that conforms to the unevenness of the surface of the first metal layer 20 facing toward the first resin layer 12. With this arrangement, the upper surface of the first metal layer 20 and the lower surface of the first resin layer 12 establish wide-area surface-to-surface contact, rather than point contact, with each other. This enables the reduction of thermal resistance between the upper surface of the first metal layer 20 and the lower surface of the first resin layer 12, thereby allowing heat to be easily transferred from the first resin layer 12 to the first metal layer 20.

The second metal layer 30 is laminated on the second resin layer 13 of the heat conduction member 10. The lower surface of the second metal layer 30 is in contact with the upper surface of the second resin layer 13 of the heat conduction member 10. Similarly to the configuration illustrated in FIG. 1C, although the lower surface of the second metal layer 30 has irregularities, the resin constituting the second resin layer 13 penetrates the recesses to the lower irregular surface of the second metal layer 30. That is, the resin constituting the second resin layer 13 has a surface shape that conforms to the unevenness of the surface of the second metal layer 30 facing toward the second resin layer 13. With this arrangement, the lower surface of the second metal layer 30 and the upper surface of the second resin layer 13 establish wide-area surface-to-surface contact, rather than point contact, with each other. This enables the reduction of thermal resistance between the lower surface of the second metal layer 30 and the upper surface of the second resin layer 13, thereby allowing heat to be easily transferred from the second metal layer 30 to the second resin layer 13.

A device serving as a heating element may be mounted on the second metal layer 30. The second metal layer 30 is patterned in accordance with, for example, an electrode structure of the device to be mounted. As the device mounted on the second metal layer 30 generates heat when operating, the heat is transferred to the first metal layer 20 via the heat conduction member 10, and is then dissipated from the first metal layer 20. The first metal layer 20 and the second metal layer 30 may be formed of a material having excellent thermal conductivity, such as copper or aluminum. The thickness of the first metal layer and the second metal layer 30 may be, for example, about 0.1 µm to 3.0 µm. Part or all of the second metal layer 30 may function as interconnect, or may alternatively be a simple metal layer that is not electrically connected to the device to be mounted. The second metal layer 30 may not be patterned. Further, the first metal layer 20 may be joined to a heatsink.

[Structure of Heat Conduction Member]

As illustrated in FIG. 1B, the plurality of carbon nanotubes 11 in the heat conduction member 10 are disposed between the first resin layer 12 and the second resin layer 13 with the longitudinal direction thereof substantially aligned with the heat conducting direction. Here, the heat conducting direction is a direction substantially perpendicular to the upper surface of the second resin layer 13 and the lower surface of the first resin layer 12. The intervals between adjacent carbon nanotubes 11 may be constant, or may not be constant. Although the adjacent carbon nanotubes 11 can be in contact with each other, there is preferably a gap between the adjacent carbon nanotubes 11. This arrangement improves the contractibility of the carbon nanotubes 11, thereby allowing the carbon nanotubes 11 to expand or contract easily.

The carbon nanotubes 11 are, for example, substantially circular-cylindrical carbon crystals having a diameter of about 0.7 to 70 nm. The length of the carbon nanotubes 11 in the longitudinal direction is, for example, 50 µm or more and 300 µm or less. The carbon nanotubes 11 have high thermal conductivity, which is, for example, about 3000 W/m·K. In order to provide a good heat conduction, the surface density of the carbon nanotubes 11 is preferably greater than or equal to $1 \times 10^{10}$ pieces/cm$^2$.

The first resin layer 12 is provided at the first ends of the plurality of carbon nanotubes 11. Spaces between the first ends of the plurality of carbon nanotubes 11 are filled with the resin constituting the first resin layer 12. In other words, the first ends of the plurality of carbon nanotubes 11 are embedded in the first resin layer 12.

The length of the portion of the plurality of carbon nanotubes 11 embedded in the first resin layer 12 at the first ends thereof is, for example, 0.1 µm or more and 10 µm or less. It may be noted that the positions of the tips 11a of the carbon nanotubes 11 at the first ends thereof may be allowed to be at varying depths.

The tips 11a of the plurality of carbon nanotubes 11 at the first ends thereof do not protrude from the lower surface of the first resin layer 12. That is, a lower portion of the first resin layer 12 adjoining the first metal layer 20 does not have the first ends of the plurality of carbon nanotubes 11 embedded therein, and contains only the resin. However, this is not an absolute requirement, and some of the tips 11a of the carbon nanotubes 11 at the first ends thereof may be allowed to reach the lower surface of the first resin layer 12 or to protrude from the lower surface.

The second resin layer 13 is provided at the second ends (i.e., opposite ends) of the plurality of carbon nanotubes 11. Spaces between the second ends of the plurality of carbon nanotubes 11 are filled with the resin constituting the second resin layer 13. In other words, the second ends of the plurality of carbon nanotubes 11 are embedded in the second resin layer 13.

The length of the portion of the plurality of carbon nanotubes 11 embedded in the second resin layer 13 at the second ends thereof is, for example, 0.1 µm or more and 10 µm or less. It may be noted that the positions of the tips 11b of the carbon nanotubes 11 at the second ends thereof may be allowed to be at varying depths.

The tips 11b of the plurality of carbon nanotubes 11 at the second ends thereof do not protrude from the upper surface of the second resin layer 13. That is, a lower portion of the second resin layer 13 adjoining the second metal layer 30 does not have the second ends of the plurality of carbon nanotubes 11 embedded therein, and contains only the resin. However, this is not an absolute requirement, and some of the tips 11b of the carbon nanotubes 11 at the second ends thereof may be allowed to reach the upper surface of the second resin layer 13 or to protrude from the upper surface.

Neither the first resin layer 12 nor the second resin layer 13 contains a filler. The thermal conductivity of each of the first and second resin layers 12 and 13 is, for example, about 0.1 W/m·K to 0.3 W/m·K. Each of the first resin layer 12 and the second resin layer 13 may be formed of, for example, a polyphenylene ether-based resin.

The thickness of each of the first resin layer 12 and the second resin layer 13 may be, for example, 1 µm or more and 30 µm or less. The thickness of each of the first resin layer 12 and the second resin layer 13 is preferably 1 µm or more and 10 µm or less, and more preferably 0.1 µm or more and 5 µm or less.

When the thickness of each of the first resin layer 12 and the second resin layer 13 is 1 µm or more and 30 µm or less, each of the first resin layer 12 and the second resin layer 13 advantageously has a low thermal resistance, which reduces a drop in the thermal conductivity of the heat conduction member 10 as a whole. When the thickness of each of the first resin layer 12 and the second resin layer 13 is 1 µm or more and 10 µm or less, such an arrangement further reduces a drop in the thermal conductivity of the heat conduction member 10 as a whole. When the thickness of each of the first resin layer 12 and the second resin layer 13 is 0.1 µm or more and 5 µm or less, such an arrangement even further reduces a drop in the thermal conductivity of the heat conduction member 10 as a whole.

In the heat conduction member 10, the first resin layer 12 containing no filler is disposed at the first ends of the carbon nanotubes 11, and the second resin layer 13 containing no filler is disposed at the second ends of the carbon nanotubes 11. Therefore, spaces at both ends of the carbon nanotubes 11 are filled with the resin constituting the first resin layer 12 and the second resin layer 13, which allows the entire structure to be formed into a sheet. In addition, the first resin layer 12 and the second resin layer 13 in the heat conduction member 10 have such a thin thickness that the heat dissipation of the heat conduction member 10 is not affected. As a result, the heat conduction member 10 is not only capable of being made into a sheet, but also has high thermal conductivity and excellent heat dissipation property. The thermal conductivity of the heat conduction member 10 may be, for example, about 20 to 30 W/m·K.

[Method of Making Heat Conduction Member]

In the following, a method of making the heat conduction member will be described. FIGS. 2A through 2C to FIGS. 4A and 4B are drawings illustrating process steps of making the heat conduction member according to the first embodiment.

Figure 2A:
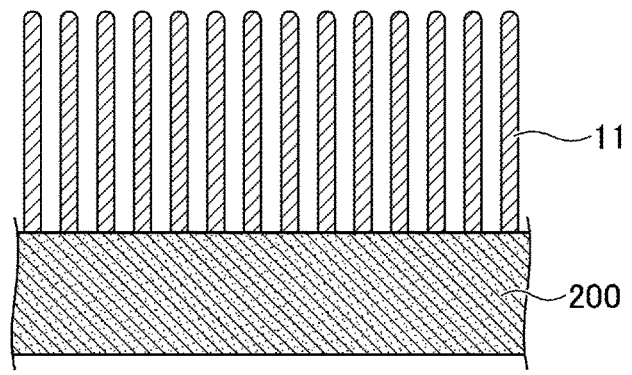
FIGS. 2A through 2C are drawings illustrating a method of making a heat conduction member according to the first embodiment.

In the step illustrated in FIG. 2A, a substrate 200 is prepared, and a plurality of carbon nanotubes 11 are formed on the upper surface of the substrate 200. The substrate 200 may be, for example, a silicon (Si) plate, a copper (Cu) plate, or the like.

More specifically, a metal catalyst layer is formed on the upper surface of the substrate 200 by sputtering or the like. As the metal catalyst layer, for example, Fe, Co, Al, Ni or the like may be used. The thickness of the metal catalyst layer may be, for example, about several nanometers. The substrate 200 with the metal catalyst layer formed thereon is then placed in a heating furnace, in which the carbon nanotubes 11 are formed on the metal catalyst layer by a CVD method (chemical vapor deposition method) at a predetermined pressure and temperature with a predetermined process gas. The pressure and temperature of the heating furnace may be, for example, 0.1 to 8.0 kPa and 500 to 800° C., respectively. The process gas may be an acetylene gas or the like, and a carrier gas such as argon gas, hydrogen gas, or the like may also be used.

Figure 2B:
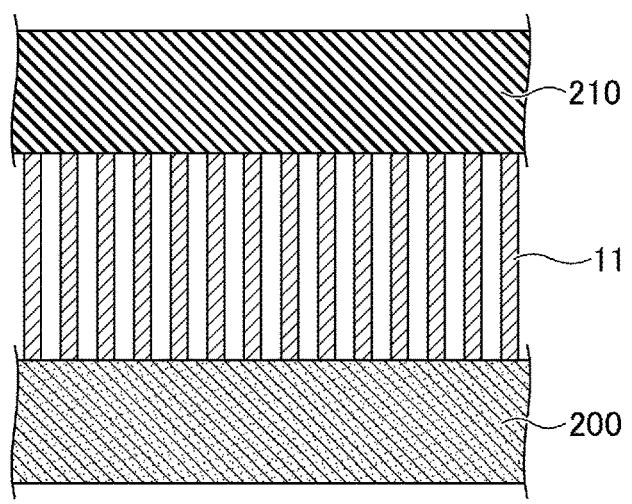
Figure 2C:
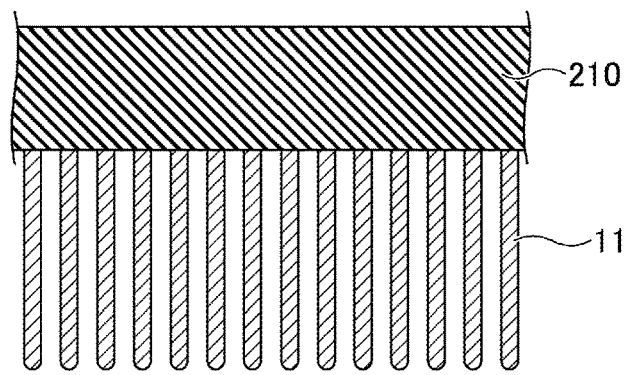

In the step illustrated in FIG. 2B, a transfer member 210 is brought into contact with the upper ends of the carbon nanotubes 11 grown on the substrate 200 and pressed against the substrate 200. The transfer member 210 may be, for example, a silicon rubber sheet or the like. In the step illustrated in FIG. 2C, the substrate 200 illustrated in FIG. 2B is removed. With this arrangement, the carbon nanotubes 11 are transferred to the transfer member 210.

Figure 3A:
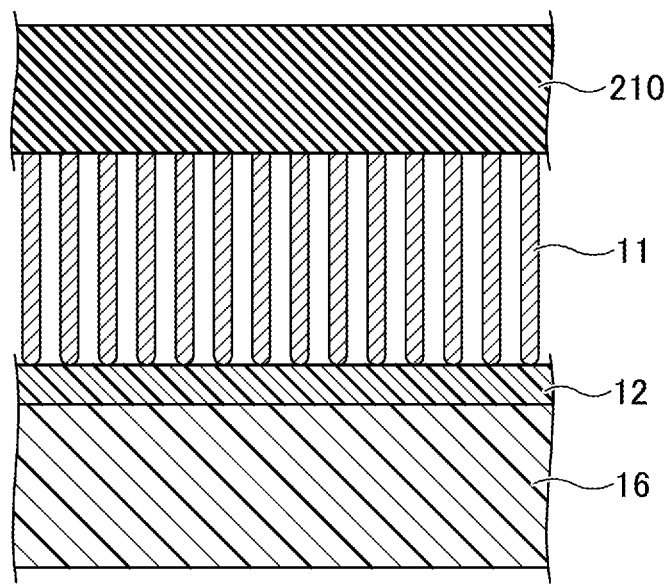
FIGS. 3A and 3B are drawings illustrating the method of making the heat conduction member according to the first embodiment.

In the step illustrated in FIG. 3A, a laminate comprised of a protective layer 16 and a first resin layer 12 is prepared, and the transfer member 210 with the carbon nanotubes 11 transferred thereto is disposed on the first resin layer 12 with the carbon nanotubes 11 facing the first resin layer 12. The first resin layer 12 may be, for example, a thermosetting polyphenylene ether-based resin film. The first resin layer 12 does not contain a filler. The protective layer 16 may be, for example, a polyethylene terephthalate film or the like.

Figure 3B:
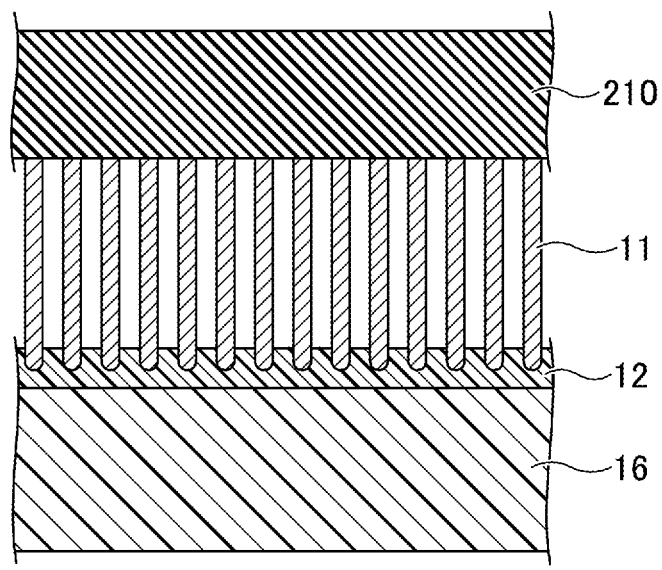

In the step illustrated in FIG. 3B, the transfer member 210 is pressed toward the first resin layer 12 while the structure illustrated in FIG. 3A is heated. With this arrangement, the first resin layer 12 is softened, and the resin constituting the first resin layer 12 fills the spaces between the first ends of the plurality of carbon nanotubes 11.

Figure 4A:
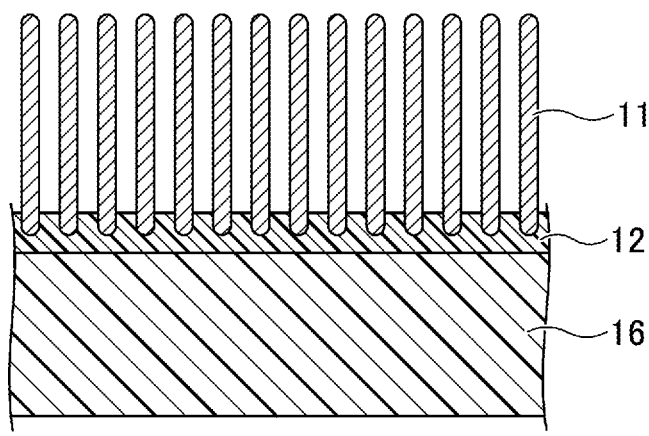
FIGS. 4A and 4B are drawings illustrating the method of making the heat conduction member according to the first embodiment.

In the step illustrated in FIG. 4A, the transfer member 210 illustrated in FIG. 3B is removed from the carbon nanotubes 11. The heat applied during the heating in the step of FIG. 3B is also applied to the transfer member 210, resulting in the softening of the transfer member 210. The transfer member 210 may thus be easily removed from the carbon nanotubes 11.

Figure 4B:
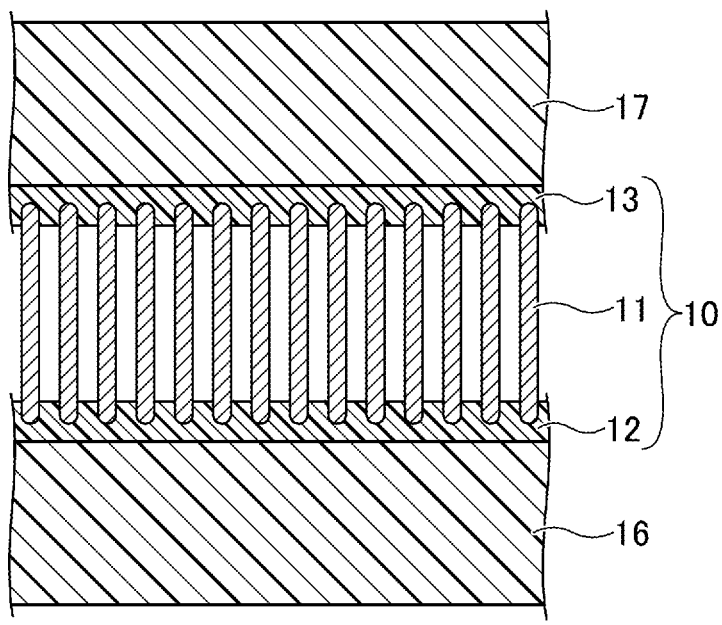

In the step illustrated in FIG. 4B, a laminate comprised of the protective layer 17 and the second resin layer 13 is prepared. The laminate is positioned with the second resin layer 13 facing the carbon nanotubes 11, and is pressed toward the first resin layer 12 while heat is applied. With this arrangement, the second resin layer 13 is softened, and the resin constituting the second resin layer 13 fills the spaces between the second ends of the plurality of carbon nanotubes 11. The second resin layer 13 may be, for example, a thermosetting polyphenylene ether-based resin film. The second resin layer 13 does not contain a filler. The protective layer 17 may be, for example, a polyethylene terephthalate film or the like. Through the steps described above, the heat conduction member including the protective layers 16 and 17 is completed in final form.

[Method of Making Substrate]

Figure 5A:
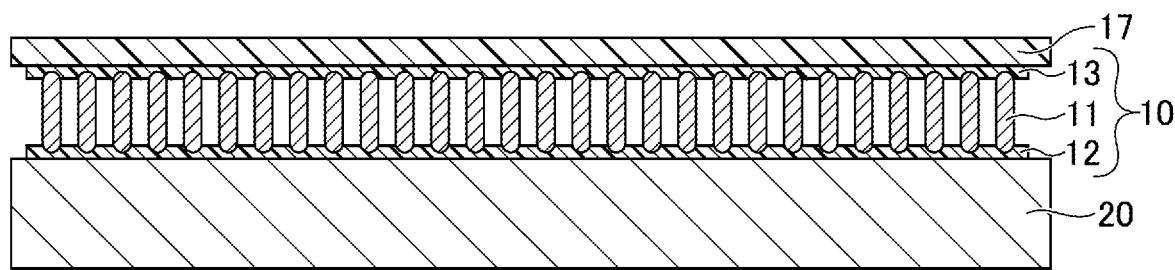
FIGS. 5A and 5B are drawings illustrating a method of making a substrate according to the first embodiment.
Figure 5B:
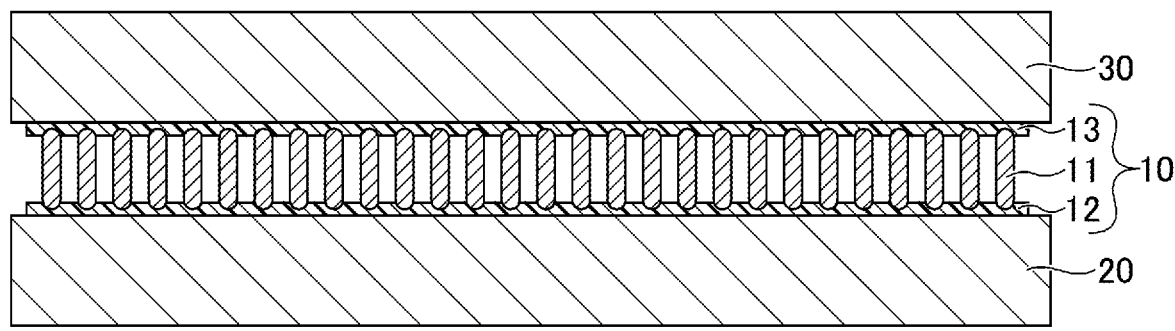

In the following, a method of making a substrate will be described. FIGS. 5A and 5B are drawings illustrating the process steps of making the substrate according to the first embodiment.

In the step illustrated in FIG. 5A, the protective layer 16 provided on the first resin layer 12 of the heat conduction member 10 illustrated in FIG. 4B is detached. A first metal layer 20 is prepared, and the heat conduction member 10 is disposed on the first metal layer 20 such that the first metal layer 20 and the first resin layer 12 are in contact with each other. Subsequently, the first resin layer 12 and the first metal layer 20 are heated to form temporary bonding between the first resin layer 12 and the first metal layer 20. The heating is performed, for example, at about 150 to 200° C. for about several minutes. During the heating, it is preferable to press down the protective layer 17 by rolling a roller or the like.

In the step illustrated in FIG. 5B, the protective layer 17 provided on the second resin layer 13 of the heat conduction member 10 is detached after the first resin layer 12 and the first metal layer 20 are cooled. A second metal layer 30 is prepared, and the second metal layer 30 is disposed on the second resin layer 13 such that the second metal layer 30 and the second resin layer 13 are in contact with each other. Subsequently, the second resin layer 13 and the second metal layer 30 are heated to form temporary bonding between the second resin layer 13 and the second metal layer 30. The heating is performed, for example, at about 150 to 200° C. for about several minutes. During the heating, it is preferable to press down the second metal layer 30 by rolling a roller or the like.

After the step illustrated in FIG. 5B, the heat conduction member 10 is finally bonded to the first metal layer 20 and the second metal layer 30. To be more specific, the first metal layer 20 and the second metal layer 30 are continuously pressed toward the heat conduction member 10 for about 10 to 20 minutes at a pressure of about 0.1 to 1.0 MPa in an atmosphere having a temperature of about 200° C., for example. Through the process steps noted above, the substrate 1 is completed in final form.

Although the upper surface of the first metal layer 20 has surface irregularities as previously described, the resin constituting the first resin layer 12 softened by heating penetrates the recesses of the upper irregular surface of the first metal layer 20 at the time of forming temporary bonding and/or permanent bonding. Therefore, the upper surface of the first metal layer 20 and the lower surface of the first resin layer 12 are in surface-to-surface contact with each other over a wide area, which serves to reduce the thermal resistance therebetween. Similarly, although the lower surface of the second metal layer 30 has surface irregularities, the resin constituting the second resin layer 13 softened by heating penetrates the recesses of the lower irregular surface of the second metal layer 30 at the time of forming temporary bonding and/or permanent bonding. Therefore, the lower surface of the second metal layer 30 and the upper surface of the second resin layer 13 are in surface-to-surface contact with each other over a wide area, which serves to reduce the thermal resistance therebetween.

In a conventional DBC (direct bonded copper) substrate or DBA (direct bonded aluminum) substrate, a ceramic substrate is provided in place of the heat conduction member 10 of the substrate 1, and the ceramic substrate is strongly bonded by diffusion bonding to metal layers disposed on the upper and lower surfaces thereof. However, the ceramic substrate is hard with low flexibility, and has a different thermal expansion coefficient than the metal layers disposed above and below the ceramic substrate. Because of this, the ceramic substrate breaks off the metal layers due to warpage caused by stress generated in response to thermal load. As a result, gaps are generated at interfaces between the metal layers and the upper and lower surfaces of the ceramic substrate, thereby causing the upper and lower surfaces of the ceramic substrate to be in point contact with the metal layers, which increases thermal resistance therebetween.

A substrate structure using an insulating resin layer, which has been replacing conventional DBC substrates and DBA substrates, uses a high thermal conductivity filler or the like to improve thermal conductivity. However, the thermal conductivity is still about 10 W/m·K.

In the substrate 1 having the heat conduction member 10, the carbon nanotubes 11 having excellent flexibility are arranged at the central position in the thickness direction of the heat conduction member 10. The carbon nanotubes 11 advantageously relieve stress caused by differences between the thermal expansion coefficients of the members at the time of thermal load. This arrangement reduces the risk of occurrence of warpage and breaking off between the heat conduction member 10 and any of the first metal layer 20 and the second metal layer at the time of thermal load. The heat conduction member 10 having the carbon nanotubes 11 has an elastic modulus of 5 GPa or less, which is sufficiently smaller than those of a ceramic substrate, solder, and the like. Further, the heat conduction member 10 having the carbon nanotubes 11 has a high thermal conductivity that is about two to three times the thermal conductivity of the substrate structure using the above-described insulating resin layer.

The fact that the resin constituting the first resin layer 12 and the second resin layer 13 is an insulating resin ensures electrical insulation between the first metal layer 20 and the second metal layer 30. Further, the insulating resin that is a thermosetting resin and thus has good heat resistance enables the realization of a heatproof temperature of about 370° C.

Variation of First Embodiment

A variation of the first embodiment is directed to an example in which the structure of a substrate is different from that of the substrate of the first embodiment. In the variation of the first embodiment, a description of the same components as those of the embodiment described above may be omitted.

Figure 6:
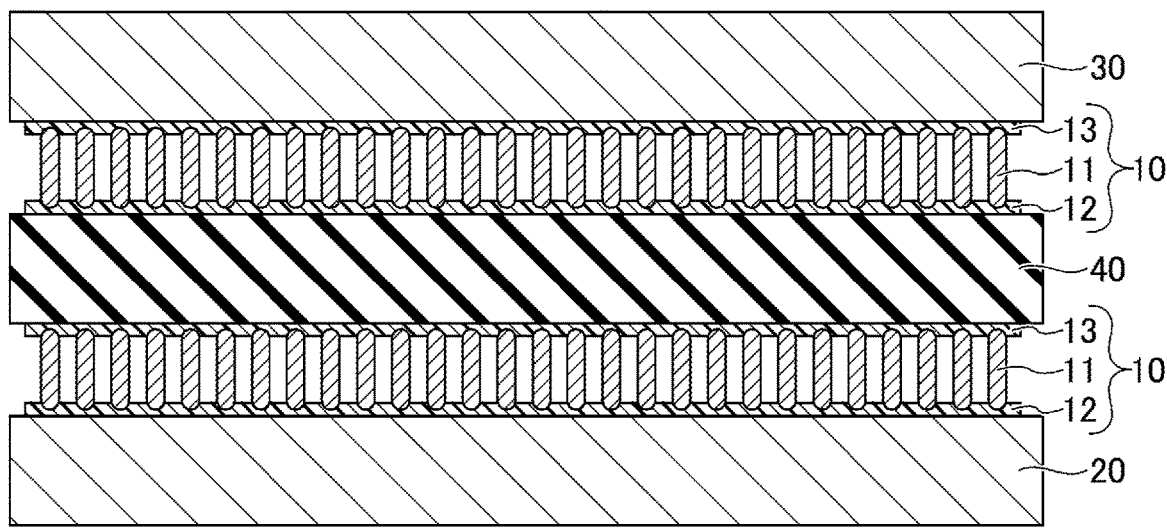
FIG. 6 is a cross-sectional view illustrating a substrate according to a first variation of the first embodiment.

FIG. 6 is a cross-sectional view illustrating a substrate according to a first variation of the first embodiment. Referring to FIG. 6, a substrate 1A according to the first variation of the first embodiment includes two heat conduction members 10, a first metal layer 20, a second metal layer 30, and a ceramic substrate 40.

The first metal layer 20 is laminated on the first resin layer 12 of one of the heat conduction members 10 (i.e., the lower heat conduction member 10 in FIG. 6). The second metal layer 30 is laminated on the second resin layer 13 of the other heat conduction member 10 (i.e., the upper heat conduction member 10 in FIG. 6). The ceramic substrate 40 is bonded between the second resin layer 13 of the one heat conduction member 10 and the first resin layer 12 of the other heat conduction member 10. In other words, the first metal layer 20 and the ceramic substrate 40 are disposed above and below each other with the one heat conduction member 10 interposed therebetween. The second metal layer 30 and the ceramic substrate 40 are arranged above and below each other with the other heat conduction member 10 interposed therebetween.

As described above, since the ceramic substrate 40 is sandwiched between the two heat conduction members 10 in the substrate 1A, the carbon nanotubes 11 of each one of the heat conduction members 10 relieve stress caused by differences in the thermal expansion coefficients of the members at the time of thermal load while positively utilizing the heat dissipation property, insulating property, and durability of the ceramic substrate 40. As a result, this arrangement enables the realization of good thermal conduction from the second metal layer to the first metal layer 20 without causing warpage or breaking off in the heat conduction members 10 at the time of thermal load.

Figure 7:
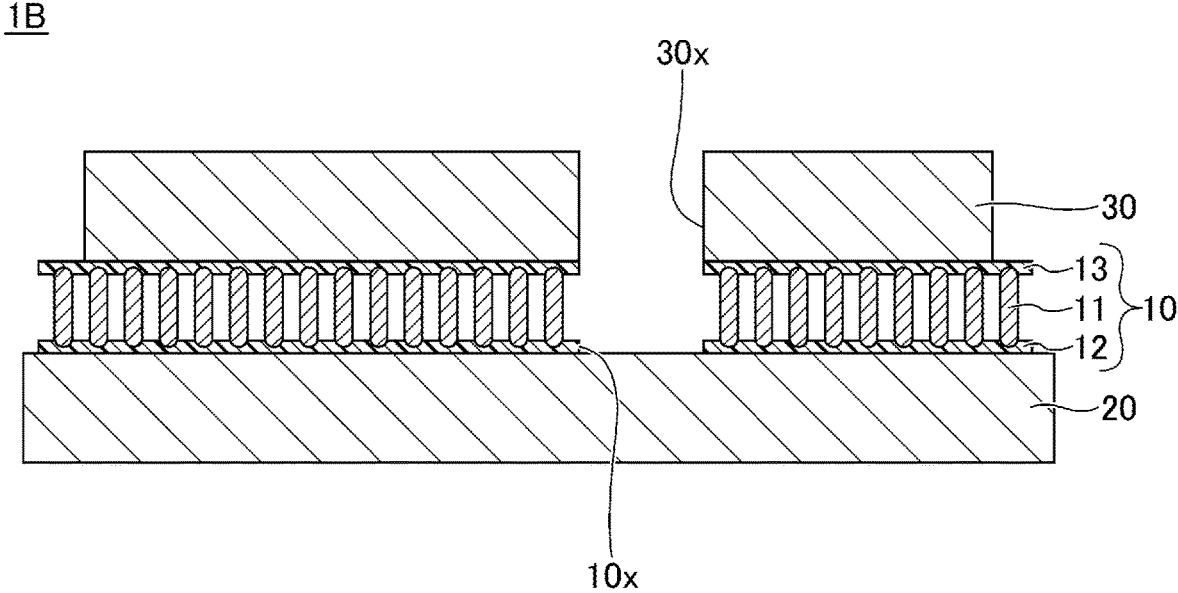
FIG. 7 is a cross-sectional view illustrating a substrate according to a second variation of the first embodiment.

FIG. 7 is a cross-sectional view illustrating a substrate according to a second variation of the first embodiment. Referring to FIG. 7, in a substrate 1B according to the second variation of the first embodiment, the heat conduction member 10 includes a first opening 10x that extends through the heat conduction member 10 and exposes the upper surface of the first metal layer 20. Further, the second metal layer 30 includes a second opening 30x that extends through the second metal layer 30 and communicates with the first opening 10x. Each of the first opening 10x and the second opening 30x may be a through hole having a circular shape or a rectangular shape in a plan view, or may be a slit that divides the heat conduction member 10 and the second metal layer 30 into a plurality of pieces. This structure of the substrate 1B allows a wire to be disposed in the first opening 10x and the second opening 30x to electrically connect the first metal layer 20 and the second metal layer 30, for example.

Figure 8:
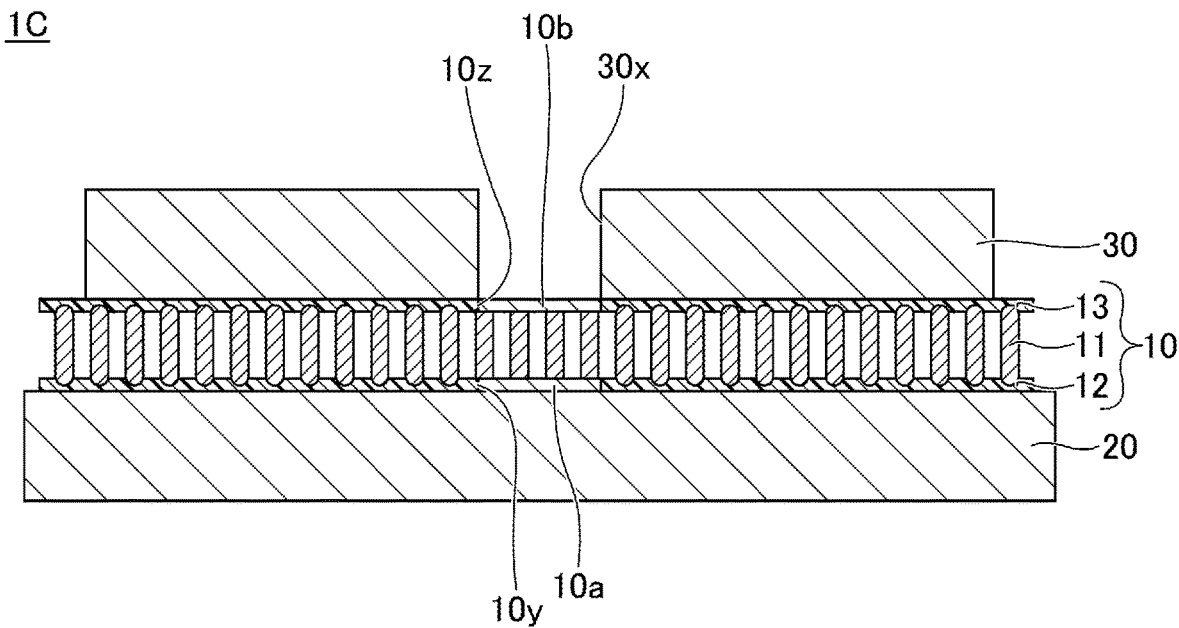
FIG. 8 is a cross-sectional view illustrating a substrate according to a third variation of the first embodiment.

FIG. 8 is a cross-sectional view illustrating a substrate according to a third variation of the first embodiment. Referring to FIG. 8, in a substrate 1C according to the third variation of the first embodiment, the heat conduction member includes the first pad 10a that extends through the first resin layer 12 and that is bonded to one end of the carbon nanotubes 11. Further, the heat conduction member 10 includes a second pad 10b that extends through the second resin layer 13 and that is bonded to the other end of the carbon nanotubes 11. The first pad 10a and the second pad 10b are electrically connected to each other via the carbon nanotubes 11.

The first pad 10a is formed in a via hole 10y extending through the first resin layer 12. Further, the second pad 10b is formed in a via hole 10z extending through the second resin layer 13. A second opening 30x extending through the second metal layer 30 is formed at the same position as the via holes 10y and 10z in a plan view.

Figure 9A:
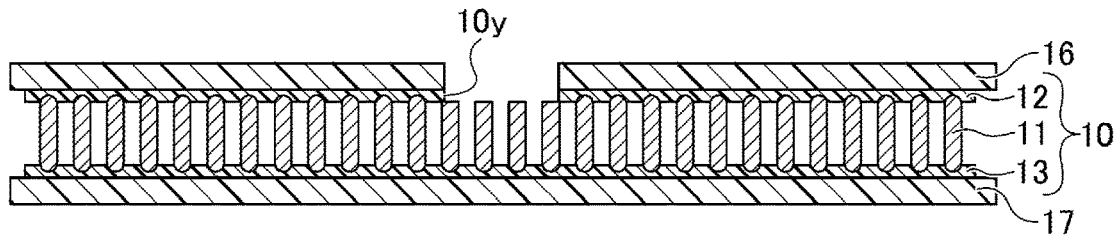
FIGS. 9A through 9D are drawings illustrating a method of making the substrate according to the third variation of the first embodiment.
Figure 9B:
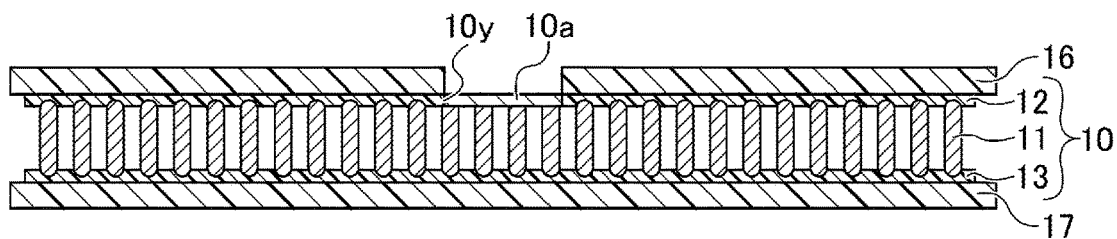

FIGS. 9A through 9D are drawings illustrating a method of making the substrate according to the third variation of the first embodiment. Views illustrated in FIGS. 9A and 9B are upside down relative to the view of FIG. 4B.

The same steps as those illustrated in FIG. 2A through FIG. 4B of the first embodiment are performed, and, then, in the step illustrated in FIG. 9A, the via hole 10y is formed that extends through the first resin layer 12 of the heat conduction member 10. The via hole 10y may be formed by, for example, irradiating the first resin layer 12 with laser light through the protective layer 16. The via hole 10y may be formed by using, for example, a carbon-dioxide laser, an ultraviolet laser, or the like.

In the step illustrated in FIG. 9B, the first pad 10a is formed in the via hole 10y. The first pad 10a may be formed by, for example, depositing a thermosetting conductive paste or a thermosetting conductive film in the via hole 10y, followed by heating and curing the paste or film.

Figure 9C:
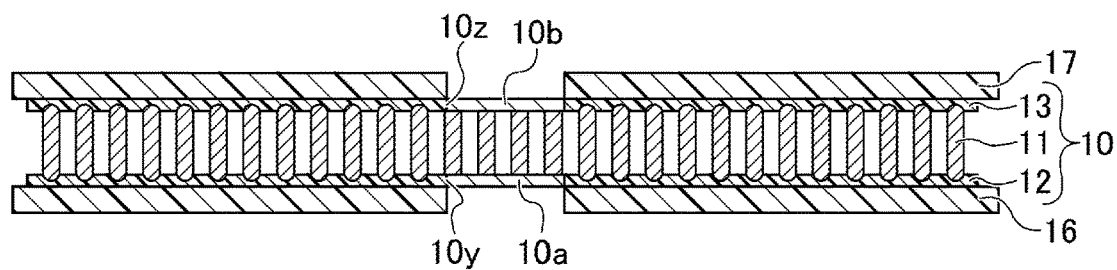

In the step illustrated in FIG. 9C, the structure illustrated in FIG. 9B is turned upside down, and the via hole 10z extending through the second resin layer 13 of the heat conduction member 10 is formed in substantially the same manner as in FIG. 9A. Further, the second pad 10b is formed in the via hole 10z in substantially the same manner as in FIG. 9B.

Figure 9D:
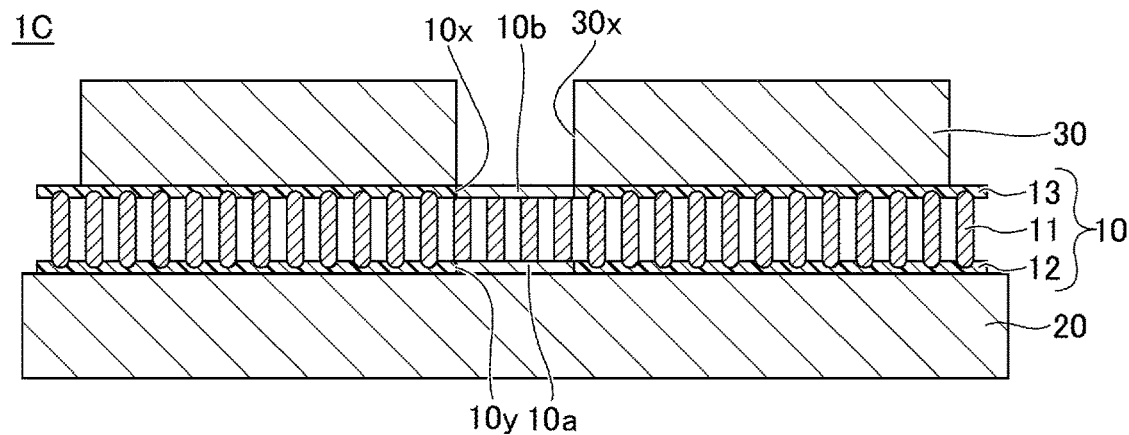

In the step illustrated in FIG. 9D, the first metal layer 20 is formed in such a manner as to be in contact with the first resin layer 12, and the second metal layer 30 having the second opening 30x is formed in such a manner as to be in contact with the second resin layer 13, in substantially the same manner as in FIGS. 5A and 5B. Through these steps, the substrate 1C is completed in final form.

The structure of the substrate 1C allows a wire to be disposed in the second opening 30x to electrically connect the second metal layer 30 and the second pad 10b, for example. As a result, the second metal layer 30 is electrically connected to the first pad 10a and the second pad 10b.

Figure 10:
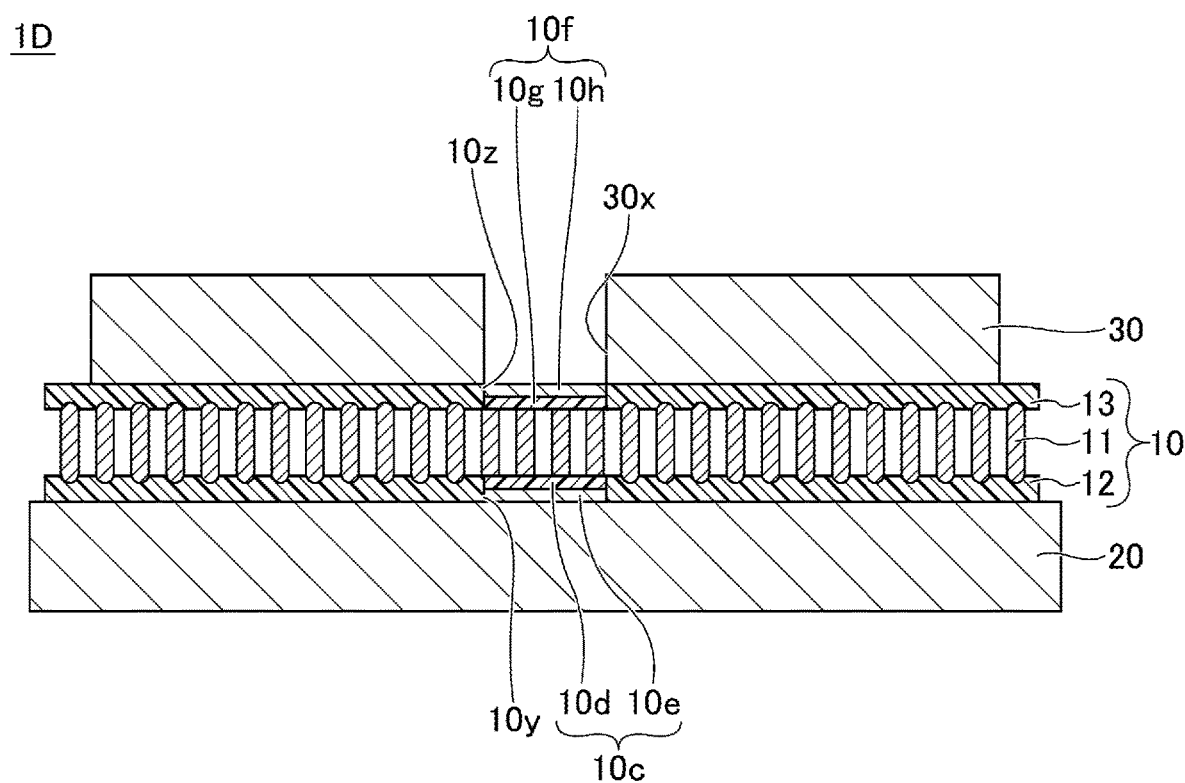
FIG. 10 is a cross-sectional view illustrating another substrate according to a third variation of the first embodiment.

FIG. 10 is a cross-sectional view illustrating another substrate according to the third variation of the first embodiment. As in a substrate 1D illustrated in FIG. 10, a first pad 10c may be formed in the via hole 10y, and a second pad 10f may be formed in the via hole 10z. The first pad 10c is constructed by laminating a thin-film resin layer 10d and a solder layer 10e in this order starting from the carbon nanotubes 11. The second pad 10f is constructed by laminating a thin-film resin layer 10g and a solder layer 10h in this order starting from the carbon nanotubes 11.

By making the thin-film resin layers 10d and 10g as thin as possible in the substrate 1D, the solder layer 10e and the solder layer 10h can be electrically connected to each other via the carbon nanotubes 11, which is expected to provide better electrical conductivity than the structure using the conductive paste or the conductive film illustrated in FIG. 9D. A sintered material, indium, or the like may be used instead of the solder layer 10e and the solder layer 10h. Such an arrangement is also expected to provide better electrical conductivity than the structure using the conductive paste or the conductive film illustrated in FIG. 9D. It may be noted that the thin film resin layers 10d and 10g serve as buffer layers because it is difficult to directly bond the carbon nanotubes 11 to a solder layer, a sintered material, indium, or the like.

Second Embodiment

A second embodiment is directed to an example in which a substrate has a heat conduction member having a different structure than that of the first embodiment. In the second embodiment, a description of the same components as those in the embodiments described heretofore may be omitted.

Figure 11A:
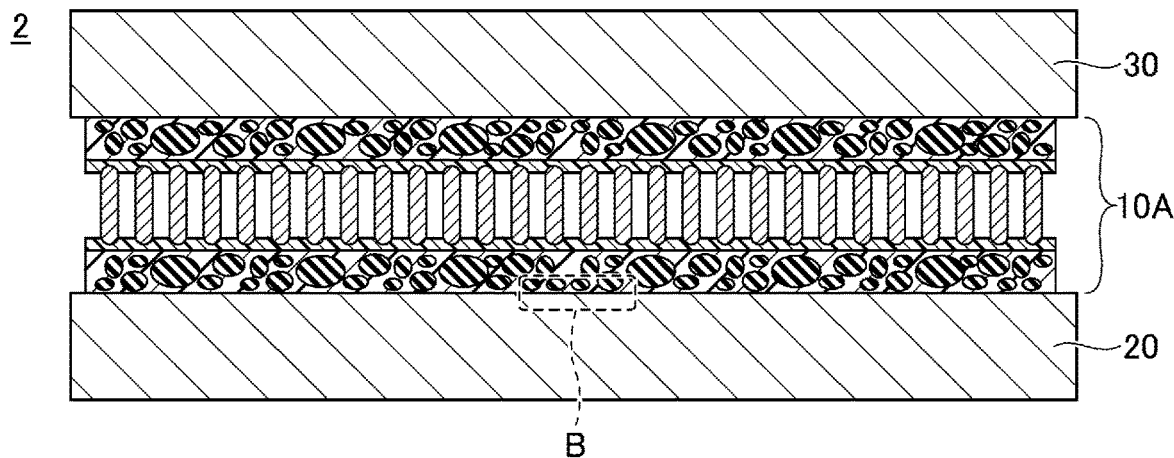
FIGS. 11A through 11C are cross-sectional views illustrating a substrate according to a second embodiment.
Figure 11B:
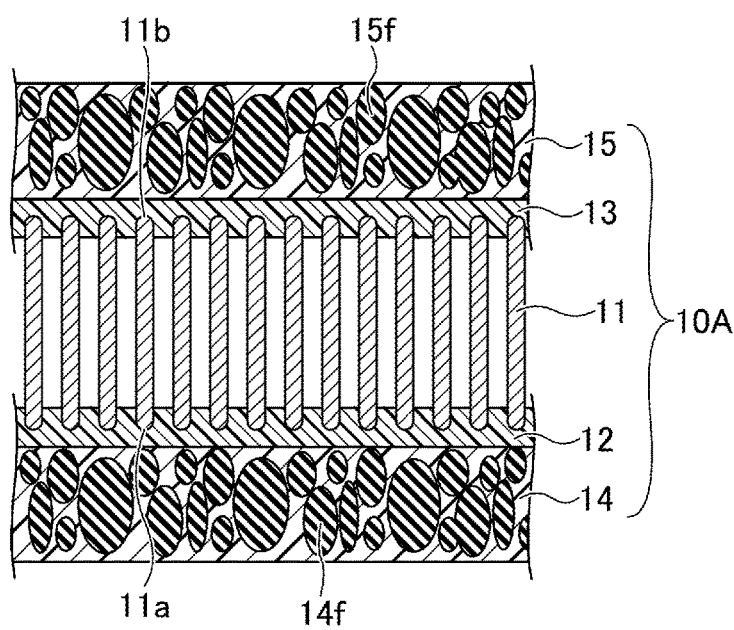
Figure 11C:
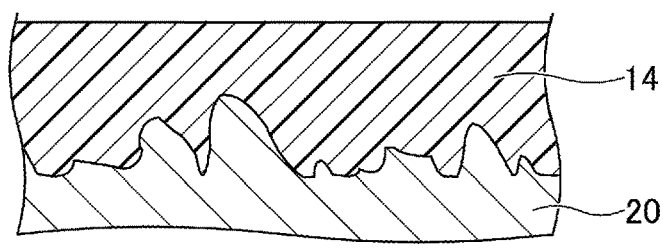

FIGS. 11A through 11C are cross-sectional views illustrating a substrate according to the second embodiment. FIG. 11A is an overall view. FIG. 11B is an enlarged partial view of a heat conduction member 10A illustrated in FIG. 11A. FIG. 11C is an enlarged view of a portion B in FIG. 11A.

Referring to FIG. 11A, a substrate 2 according to the second embodiment differs from the substrate 1 (see FIG. 1A and the like) in that the heat conduction member 10 is replaced with a heat conduction member 10A.

In addition to the same configuration as the heat conduction member 10, the heat conduction member 10A further includes a third resin layer 14 laminated on the first resin layer 12 on the side closer to the first metal layer 20, and a fourth resin layer 15 laminated on the second resin layer 13 on the side closer to the second metal layer 30.

The first metal layer 20 is laminated on the third resin layer 14 of the heat conduction member 10A. The upper surface of the first metal layer 20 is in contact with the lower surface of the third resin layer 14 of the heat conduction member 10A. As illustrated in FIG. 11C, although the upper surface of the first metal layer 20 has surface irregularities, the resin constituting the third resin layer 14 penetrates the recesses of the upper irregular surface of the first metal layer 20. That is, the resin constituting the third resin layer 14 has a surface shape that conforms to the unevenness of the surface of the first metal layer 20 facing the third resin layer 14. With this arrangement, the upper surface of the first metal layer 20 and the lower surface of the third resin layer 14 establish wide-area surface-to-surface contact, rather than point contact, with each other. This reduces thermal resistance between the upper surface of the first metal layer 20 and the lower surface of the third resin layer 14, thereby readily transferring heat from the third resin layer 14 to the first metal layer 20.

The second metal layer 30 is laminated on the fourth resin layer 15 of the heat conduction member 10A. The lower surface of the second metal layer 30 is in contact with the upper surface of the fourth resin layer 15 of the heat conduction member 10A. Similarly to the case illustrated in FIG. 11C, although the lower surface of the second metal layer 30 has surface irregularities, the resin constituting the fourth resin layer 15 penetrates the recesses of the lower irregular surface of the second metal layer 30. That is, the resin constituting the fourth resin layer 15 has a surface shape that conforms to the unevenness of the surface of the second metal layer 30 facing the fourth resin layer 15. With this arrangement, the lower surface of the second metal layer 30 and the upper surface of the fourth resin layer 15 establish wide-area surface-to-surface contact, rather than point contact, with each other. This reduces thermal resistance between the lower surface of the second metal layer 30 and the upper surface of the fourth resin layer 15, thereby readily transferring heat from the second metal layer 30 to the fourth resin layer 15.

Similarly to the first embodiment, neither the first resin layer 12 nor the second resin layer 13 contains a filler. However, the third resin layer 14 contains a filler 14f. The third resin layer 14 has a higher thermal conductivity than the first resin layer 12. The fourth resin layer 15 contains a filler 15f. The fourth resin layer 15 has a higher thermal conductivity than the second resin layer 13. The fillers 14f and 15f may be, for example, alumina, aluminum nitride, or the like. The size of the fillers 14f and 15f may be, for example, about 0.1 µm to 10 µm. The thermal conductivity of each of the first and second resin layers 12 and 13 is, for example, about 0.1 W/m·K to 0.3 W/m·K. In contrast, the thermal conductivity of each of the third resin layer 14 and the fourth resin layer 15 is, for example, about 1 W/m·K to 15 W/m·K.

The third resin layer 14 and the fourth resin layer 15 may be formed of, for example, a polyphenylene ether-based resin. The resin layers constituting the third resin layer 14 and the fourth resin layer 15 may be formed of a resin different from that of the first resin layer 12 and the second resin layer 13.

Preferably, the first resin layer 12 is thinner than the third resin layer 14, and the second resin layer 13 is thinner than the fourth resin layer 15. The thickness of each of the first resin layer 12 and the second resin layer 13 may be, for example, 1 µm or more and 30 µm or less. The thickness of each of the first resin layer 12 and the second resin layer 13 is preferably 1 µm or more and 10 µm or less, and more preferably 0.1 µm or more and 5 µm or less. The thickness of each of the third resin layer 14 and the fourth resin layer 15 may be, for example, about 50 µm to 250 µm.

The thermal conductivity of the first resin layer 12 is lower than that of the third resin layer 14, and the thermal conductivity of the second resin layer 13 is lower than that of the fourth resin layer 15. However, when the thicknesses of the first and second resin layers 12 and 13 are not less than 1 µm and not more than 30 µm, the first and second resin layers 12 and 13 advantageously have a low thermal resistance, which reduces a drop in the thermal conductivity of the heat conduction member 10A as a whole. When the thicknesses of the first and second resin layers 12 and 13 are 1 µm or more and 10 µm or less, such an arrangement further reduces a drop in the thermal conductivity of the heat conduction member 10A as a whole. When the thicknesses of the first and second resin layers 12 and 13 are 0.1 µm or more and 5 µm or less, such an arrangement even further reduces a drop in the thermal conductivity of the heat conduction member 10A as a whole.

Similarly to the heat conduction member 10, the heat conduction member 10A is configured such that the first resin layer 12 containing no filler is disposed on the first ends of the carbon nanotubes 11, and the second resin layer 13 containing no filler is disposed on the second (opposite) ends of the carbon nanotubes 11. With this arrangement, spaces between both ends of the carbon nanotubes 11 are advantageously filled with the resin constituting the first resin layer 12 and the second resin layer 13, which allows the entire structure to be formed into a sheet. Further, the first and second resin layers 12 and 13 have such a thin thickness that the heat dissipation of the heat conduction member 10A is not affected. Also, the third resin layer 14 having good thermal conductivity is laminated on the first resin layer 12, and the fourth resin layer 15 having good thermal conductivity is laminated on the second resin layer 13. As a result, the heat conduction member 10A is not only capable of being formed into a sheet and also has high thermal conductivity and excellent heat dissipation property. When the carbon nanotubes 11, the first metal layer 20, and the second metal layer are in contact with the fillers 14f and 15f in the third and fourth resin layers 14 and 15, for example, the thermal conductivity of the heat conduction member 10A may successfully be set to about 20 to 30 W/m·K.

Replacing the heat conduction member 10 of the substrate 1 with the heat conduction member 10A as in the substrate 2 successfully provides the same effects as those of the substrate 1. The heat conduction member 10A may be made in substantially the same manner as the heat conduction member 10, except for the differences described below. In the step illustrated in FIG. 3A, a laminate of the protective layer 16, the third resin layer 14, and the first resin layer 12 is prepared. In the step illustrated in FIG. 4B, a laminate of the protective layer 17, the fourth resin layer 15, and the second resin layer 13 is prepared.

Although the preferred embodiments and the like have heretofore been described in detail, the present invention is not limited to the above-described embodiments and the like, and various modifications and substitutions may be made to the above-described embodiments and the like without departing from the scope defined in the claims.

For example, the first to third variations of the first embodiment may be combined with the second embodiment as long as there is no technical contradiction.

For example, when the third variation of the first embodiment is combined with the second embodiment, the heat conduction member includes a first pad extending through both the first resin layer and the third resin layer and bonded to the first ends of the carbon nanotubes, and also includes a second pad extending through the second resin layer and the fourth resin layer and bonded to the second ends of the carbon nanotubes. The first pad and the second pad are electrically connected to each other via the carbon nanotubes.

According to at least one embodiment, a substrate is provided that is made of a heat conduction member capable of relieving stress at the time of thermal load and having high thermal conductivity.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A substrate, comprising:
 a heat conduction member including a plurality of carbon nanotubes, a first resin layer provided on first ends of the plurality of carbon nanotubes, and a second resin layer provided on second ends of the plurality of carbon nanotubes, the second ends being opposite the first ends;
 a first metal layer laminated on the first resin layer; and
 a second metal layer laminated on the second resin layer, wherein neither the first resin layer nor the second resin layer contains a filler, wherein spaces between the first ends of the plurality of carbon nanotubes are filled with a resin constituting the first resin layer, and spaces between the second ends of the plurality of carbon nanotubes are filled with a resin constituting the second resin layer, and wherein the first resin layer and the second resin layer are formed of a polyphenylene ether-based resin.

2. The substrate as claimed in claim 1, wherein the heat conduction member further includes a third resin layer laminated on a same side of the first resin layer as the first metal layer and a fourth resin layer laminated on a same side of the second resin layer as the second metal layer, wherein the third resin layer has a higher thermal conductivity than the first resin layer, and the fourth resin layer has a higher thermal conductivity than the second resin layer, and wherein the third resin layer and the fourth resin layer contain a filler.

3. The substrate as claimed in claim 2, wherein the resin constituting the third resin layer has a surface shape conforming to unevenness of a first surface of the first metal layer, the first surface facing the third resin layer, and wherein the resin constituting the fourth resin layer has a surface shape conforming to unevenness of a second surface of the second metal layer, the second surface facing the fourth resin layer.

4. The substrate as claimed in claim 2, wherein the first resin layer is thinner than the third resin layer, and the second resin layer is thinner than the fourth resin layer.

5. The substrate as claimed in claim 2, wherein the third resin layer and the fourth resin layer are formed of a polyphenylene ether-based resin.

6. The substrate as claimed in claim 2, wherein the heat conduction member includes a first pad and a second pad, the first pad extending through both the first resin layer and the third resin layer and bonded to first ends of additional carbon nanotubes, the second pad extending through both the second resin layer and the fourth resin layer and bonded to second ends of the additional carbon nanotubes, and wherein the first pad and the second pad are electrically connected to each other through the additional carbon nanotubes.

7. The substrate as claimed in claim 1, wherein the resin constituting the first resin layer has a surface shape conforming to unevenness of a first surface of the first metal layer, the first surface facing the first resin layer, and wherein the resin constituting the second resin layer has a surface shape conforming to unevenness of a second surface of the second metal layer, the second surface facing the second resin layer.

8. The substrate as claimed in claim 1, wherein a portion of the first resin layer on a side closer to the first metal layer does not have the first ends of the plurality of carbon nanotubes embedded therein, and contains only a resin, and wherein a portion of the second resin layer on a side closer to the second metal layer does not have the second ends of the plurality of carbon nanotubes embedded therein, and contains only a resin.

9. The substrate as claimed in claim 1, wherein the heat conduction member includes a first opening extending through the heat conduction member and exposing the first metal layer, and the second metal layer includes a second opening extending through the second metal layer and communicating with the first opening.

10. The substrate as claimed in claim 1, wherein the heat conduction member includes a first pad and a second pad, the first pad extending through the first resin layer and bonded to first ends of additional carbon nanotubes, the second pad extending through the second resin layer and bonded to second ends of the additional carbon nanotubes, and wherein the first pad and the second pad are electrically connected to each other through the additional carbon nanotubes.

11. A substrate, comprising:

two heat conduction members each including a plurality of carbon nanotubes, a first resin layer provided on first ends of the plurality of carbon nanotubes, and a second resin layer provided on second ends of the plurality of carbon nanotubes, the second ends being opposite the first ends;

a first metal layer laminated on the first resin layer of a first one of the heat conduction members;

a second metal layer laminated on the second resin layer of a second one of the heat conduction members; and a ceramic substrate sandwiched between the second resin layer of the first one of the heat conduction members and the first resin layer of the second one of the heat conduction members, wherein neither the first resin layer nor the second resin layer contains a filler in any one of the heat conduction members, and wherein spaces between the first ends of the plurality of carbon nanotubes are filled with a resin constituting the first resin layer in each of the heat conduction members, and spaces between the second ends of the plurality of carbon nanotubes are filled with a resin constituting the second resin layer in each of the heat conduction members.

* * * * *